US009778660B2

(12) United States Patent
Von Novak

(10) Patent No.: US 9,778,660 B2
(45) Date of Patent: Oct. 3, 2017

(54) UNMANNED AERIAL VEHICLE LOW-POWER OPERATION

(71) Applicant: QUALCOMM Incorporated, San Diego, CA (US)

(72) Inventor: William Henry Von Novak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 14/855,434

(22) Filed: Sep. 16, 2015

(65) Prior Publication Data

US 2017/0075360 A1    Mar. 16, 2017

(51) Int. Cl.
*G05D 1/04* (2006.01)
*B64C 39/02* (2006.01)
(Continued)

(52) U.S. Cl.
CPC ............ *G05D 1/042* (2013.01); *B64C 27/08* (2013.01); *B64C 39/024* (2013.01); *G05D 1/0011* (2013.01); *G05D 1/0088* (2013.01); *B64C 2201/108* (2013.01); *B64C 2201/14* (2013.01); *B64C 2201/141* (2013.01); *B64C 2201/18* (2013.01)

(58) Field of Classification Search
CPC .... G05D 1/042; G05D 1/0808; G05D 1/0816; G05D 1/085; G05D 1/0858; G05D 1/101; G05D 1/102; G05D 1/0011; G05D 1/0088; B64C 27/08; B64C 27/12; B64C 27/14; B64C 27/16; B64C 27/00; B64C 27/02; B64C 2201/018; B64C 2201/141; B64C 2201/146; B64C 2201/00; B64C 2201/024; B64C 2203/00; B64C 29/00; B64C 2201/18; B64C 2201/108
See application file for complete search history.

(56) References Cited

U.S. PATENT DOCUMENTS 8,366,037 B2    2/2013  Morris et al.
8,800,936 B2    8/2014  Cowley et al.
(Continued)

FOREIGN PATENT DOCUMENTS

WO        2014165502 A1    10/2014

*Primary Examiner* — Thomas G Black
*Assistant Examiner* — Sara Lewandroski
(74) *Attorney, Agent, or Firm* — The Marbury Law Group, PLLC

(57) ABSTRACT

Methods, devices, and systems of various embodiments are disclosed for operating a UAV having insufficient power to operate normally. Various embodiments include determining whether an emergency-recovery state of a battery of the UAV has been reached while the UAV is flying. An emergency recovery mode may be activated in response to determining that the emergency-recovery state has been reached. The emergency recovery mode may switch the rotors from drawing energy from the battery to generate propulsion to harvesting energy from airflow that is used to recharge a battery of the UAV. A braking mode may be activated in response to determining that a braking altitude has been reached. The braking mode may switch the rotors from energy harvesting to drawing energy from the battery to generate propulsion in order to reduce a descent rate of the UAV.

24 Claims, 4 Drawing Sheets

(51) Int. Cl.
*B64C 27/08* (2006.01)
*G05D 1/00* (2006.01)

(56) References Cited

U.S. PATENT DOCUMENTS

| | | | |
|---|---|---|---|
| 8,954,206 B2* | 2/2015 | Criado | G05D 1/105 |
| | | | 180/65.1 |
| 9,045,234 B2* | 6/2015 | Frolov | B64D 33/00 |
| 9,376,208 B1* | 6/2016 | Gentry | B64C 39/024 |
| 9,527,588 B1* | 12/2016 | Rollefstad | B64C 39/024 |
| 2014/0103158 A1* | 4/2014 | Berry | B64C 29/0025 |
| | | | 244/2 |
| 2016/0009388 A1* | 1/2016 | Brotherton-Ratcliffe | B64C 27/20 |
| | | | 244/17.13 |
| 2016/0244176 A1* | 8/2016 | Xiao | B60L 7/10 |

* cited by examiner

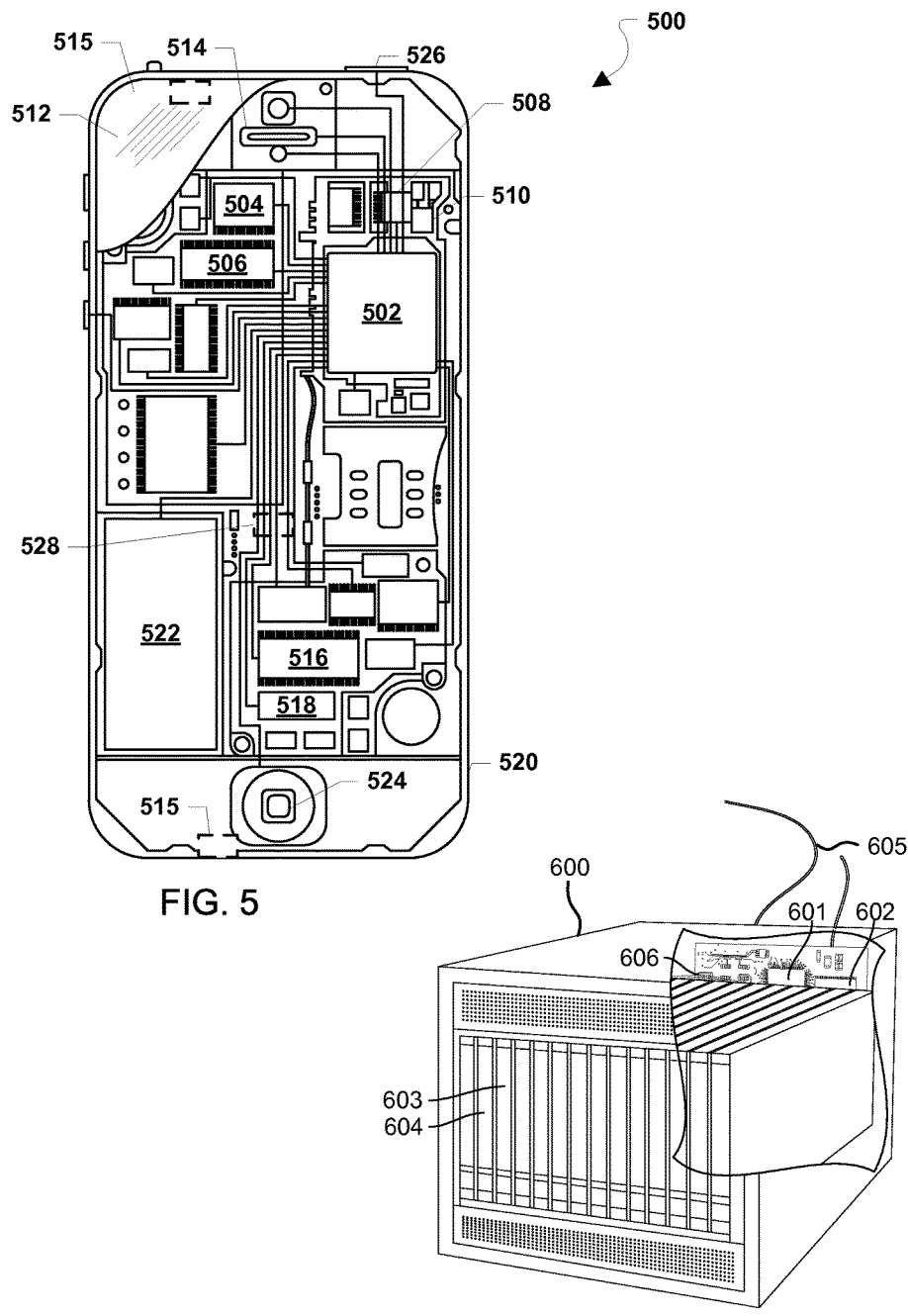

UNMANNED AERIAL VEHICLE LOW-POWER OPERATION

BACKGROUND

Unmanned aerial vehicles (UAVs) have a maximum travel range due to a finite supply of onboard energy. In addition, the total energy that a particular unmanned aerial vehicle (UAV) may have available to operate is generally less than the full onboard energy because the UAV must keep some energy in reserve for maneuvers associated with landing and/or as a margin of error in case power measurements are inaccurate. If the UAV improperly gauges available onboard energy, the UAV may prematurely lose power and crash.

SUMMARY

Methods, devices, and systems of various embodiments are disclosed for operating a UAV having insufficient power to operate normally. Various embodiments include determining whether an emergency-recovery state of a battery of the UAV has been reached while the UAV is flying and activating an emergency recovery mode in response to determining that the emergency-recovery state has been reached. In various embodiments, emergency recovery mode may switch the rotors from drawing power from the battery for generating propulsion to harvesting energy from airflow that is used to recharge a battery of the UAV. Various embodiments may include determining whether a braking altitude has been reached and activating a braking mode in response to determining a braking altitude has been reached. The braking mode may draw energy from the battery to generate propulsion with the rotors in order to reduce a descent rate of the UAV.

In some embodiments, the emergency-recovery state may be a battery charge state in which the battery has insufficient stored energy to enable the UAV to conduct a normal landing from a current altitude. In some embodiments, the emergency-recovery state may be defined by a total amount of stored energy needed to land the UAV minus an amount of energy estimated to be harvested by the rotors during the emergency recovery mode before reaching the braking altitude. In some embodiments, the emergency-recovery state may be a battery charge state in which the battery has insufficient stored energy to enable the UAV to maintain level flight. In some embodiments, the emergency-recovery state may be measured from a voltage level of the battery. In some embodiments, the emergency-recovery state may be a predetermined rate of change of a stored energy capacity of the battery.

Some embodiments may include determining whether a warning battery charge state of the UAV has been reached while the UAV is flying. The warning battery charge state may be a battery charge state in which the battery stores has stored a predetermined percentage of a maximum stored energy of the battery and provides an indication that the UAV should initiate a landing. In some embodiments, a sensor, processor, or other element may detect whether the UAV should use an extended flight protocol in response to determining that the warning state of UAV has been reached. In some embodiments, the rotors may be maintained in an energy consumption mode for propulsion in response to determining that the UAV should use the extended flight protocol. The emergency recovery mode may include using at least one motor controlling at least one of the rotors to maintain a stable attitude by regulating an amount of energy generated by the at least one motor in order to adjust an amount of drag generated by the rotors.

In some embodiments, a signal may be received commanding the UAV to use an extended flight protocol that includes the emergency recovery mode. The braking mode may include regulating an amount of energy generated by the rotors to control an amount of drag generated by each rotor in order to maintain attitude control and/or direct the UAV to a landing site.

Further embodiments include a UAV having a processor configured to execute operations of the methods described above. Further embodiments include a UAV having means for performing functions of the method operations described above. Further embodiments include a non-transitory processor-readable storage medium having stored thereon processor-executable instructions configured to cause a processor to perform operations of the above-discussed method operations.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

FIG. 5 is a component diagram of a mobile computing device suitable for use with various embodiments.

FIG. 6 is a component diagram of server suitable for use with various embodiments.

DETAILED DESCRIPTION

Figure 1:
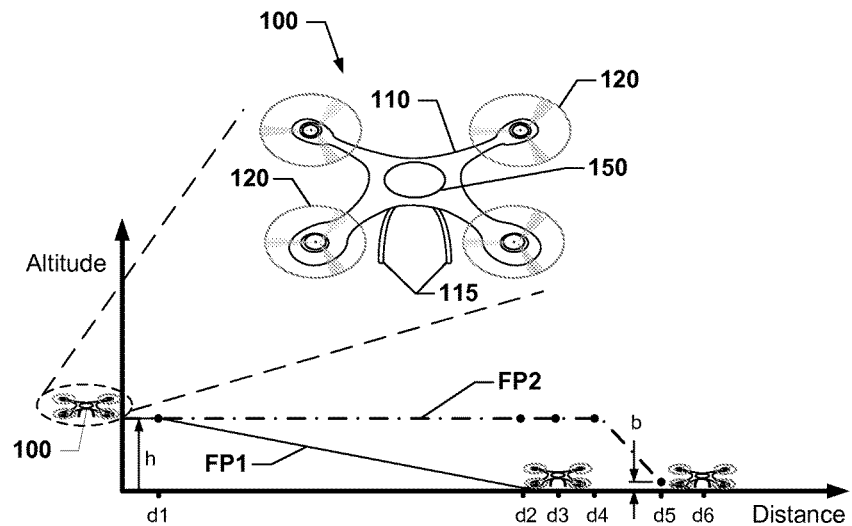
FIG. 1 is a chart of altitude versus distance comparing two UAV flight paths during low-energy operation, including a relief perspective view of a UAV, according to various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include a method of operating a UAV that may harvest potential energy in altitude by using the rotors to recharge an onboard battery during a rapid descent, and then use energy stored during the descent in order to power the rotors to slow the descent and perform an emergency recovery landing. Various embodiments may include determining, while the UAV is flying, whether an emergency-recovery state of a battery of the UAV has been reached. In response to determining that the emergency-recovery state has been reached, an emergency recovery mode may be activated. The emergency recovery mode may switch the rotors from drawing power from the battery for propulsion to harvesting energy from airflow, with the amount of energy harvested by each rotor being controlled in order to maintain a stable attitude through a rapid descent. During the emergency recovery mode, the energy harvested by the rotors is used to recharge the battery. During the rapid descent, the UAV monitors its descent relative to a descent profile (e.g., rate of descent) to determine when the UAV reaches an altitude at which braking should commence in order to achieve the soft landing (referred to herein as the "braking altitude"). The braking altitude may depend upon the rate of descent, the weight of the UAV, rotor thrust capabilities, altitude, air temperature, and humidity. Thus, the braking altitude may be determined by the UAV during the rapid descent based on stored values and measured or received atmospheric conditions. When a braking altitude is reached, a braking mode may be activated that switches the rotors from harvesting energy to powering the rotors from the stored energy harvested from the airflow during the emergency recovery mode in order to reduce the descent rate of the UAV and perform a soft landing.

As used herein, the term "UAV" refers to one of various types of unmanned aerial vehicle. A UAV may include an onboard computing device configured to fly and/or operate the UAV without remote operating instructions (i.e., autonomously), such as from a human operator or remote computing device. Alternatively, the onboard computing device may be configured to fly and/or operate the UAV with some remote operating instruction or updates to instructions stored in a memory of the onboard computing device. The UAV may be propelled for flight in any of a number of known ways. For example, a plurality of propulsion units, each including one or more rotors, may provide propulsion or lifting forces for the UAV and any payload carried by the UAV. In addition, the UAV may include wheels, tank-treads, or other non-aerial movement mechanisms to enable movement on the ground. Further, the UAV may be powered by one or more types of power source, such as electrical, chemical, electro-chemical, or other power reserve, which may power the propulsion units, the onboard computing device, and/or other onboard components.

The term "state" with reference to a battery (e.g., "battery charge state," "state of a UAV battery," "emergency-recovery state of a battery," or "warning state of a battery") is used herein generally to refer to a measure of the amount of energy stored in a battery of the UAV that is available to power the rotors. Energy stored in a battery in the form of chemical energy that is converted to electrical energy as the battery is discharged. Charging the battery involves the reverse reaction in which electrical energy is converted into stored chemical energy. The amount of energy available to power the rotors may depend upon both the amount of chemical energy stored in the battery as well as other factors, such as temperature, that can affect the efficiency of which chemical energy can be converted to electrical energy. A warning state of a battery corresponds to a first amount of energy stored in the battery, while the emergency-recovery state of the battery corresponds to a second amount of energy (e.g., a lesser amount or no energy) stored in the battery.

The term "computing device" is used herein to refer to an electronic device equipped with at least a processor. Examples of computing devices may include UAV flight control and/or mission management computer that are onboard the UAV, as well as remote computing devices communicating with the UAV configured to perform operations of the various embodiments. Remote computing devices may include wireless communication devices (e.g., cellular telephones, wearable devices, smart-phones, web-pads, tablet computers, Internet enabled cellular telephones, Wi-Fi® enabled electronic devices, personal data assistants (PDA's), laptop computers, etc.), personal computers, and servers. In various embodiments, computing devices may be configured with memory and/or storage as well as wireless communication capabilities, such as network transceiver(s) and antenna(s) configured to establish a wide area network (WAN) connection (e.g., a cellular network connection, etc.) and/or a local area network (LAN) connection (e.g., a wireless connection to the Internet via a Wi-Fi® router, etc.).

The term "server" as used herein refers to any computing device capable of functioning as a server, such as a master exchange server, web server, and a personal or business computing device configured with software to execute server functions (e.g., a "light server"). Thus, various computing devices may function as a server, such as any one or all of cellular telephones, smart-phones, web-pads, tablet computers, Internet enabled cellular telephones, Wi-Fi enabled electronic devices, laptop computers, personal computers, and similar electronic devices equipped with at least a processor, memory, and configured to communicate with a UAV. A server may be a dedicated computing device or a computing device including a server module (e.g., running an application that may cause the computing device to operate as a server). A server module (or server application) may be a full function server module, or a light or secondary server module (e.g., light or secondary server application). A light server or secondary server may be a slimmed-down version of server type functionality that can be implemented on a personal or business computing device, such as a smart phone, thereby enabling it to function as an Internet server (e.g., an enterprise e-mail server) to a limited extent, such as necessary to provide the functionality described herein. An example of server suitable for use with the various embodiments is described with reference to FIG. 9.

The word "exemplary" is used herein to mean "serving as an example, instance, or illustration." Any implementation described herein as "exemplary" is not necessarily to be construed as preferred or advantageous over other implementations.

Like many aerial vehicles, UAVs are programmed with precautions to ensure onboard stored energy never falls below a level of total energy (i.e. powered times maneuvering time) needed to land the UAV safely. In normal UAV flight, landing requires power applied to the rotors to generate propulsion (i.e., thrust) downward. Battery-powered UAVs are typically programmed (or flown manually) to maintain a battery reserve as a safety precaution, with the battery reserves set at a state of a battery that provides sufficient energy to enable a safe landing of the UAV with some margin. However, the battery reserve necessarily represents lost flight time, since the UAV is not allowed to fully deplete the onboard batteries (i.e., not operate below the battery reserve). If the battery reserve were not necessary for a safe landing, UAV flights might be extended. In addition, if an error is made in gauging the battery charge state, the UAV may experience a premature loss of power.

Various embodiments make use of the potential energy of a UAV flying at a given altitude by enabling the rotors to charge the battery during a rapid descent. At least some of the potential energy available to the UAV descending from the altitude above the ground may be converted into electrical energy by the rotors spinning in the airflow created by the rapid descent. The energy generated by the rotors is stored in the onboard battery, and the harvested energy stored in the battery is then used to power the rotors to safely land the UAV. In particular, various embodiments control the UAV motors attached to the rotors so that the motors function as generators. Thus, the rotors and motors used to generate thrust during normal flight, capture energy from the air flowing around the UAV as it falls in order to recharge the onboard battery. Generating electricity by the rotors during the descent increases drag, slowing the rate of descent. By regulating the amount of electricity generated by each rotor, the drag imposed by each rotor can be adjusted, thereby providing a manner of stabilizing the attitude of the UAV during the descent. Essentially, the control rules used to maintain a stable attitude during power flight by adjusting the amount of power applied to each rotor are inverted to maintain a stable attitude during the rapid descent by adjusting the amount of power harvested by each rotor. When the UAV is near the ground at what is referred to herein as the "braking altitude", the system begins powering the rotors from the battery switching to a braking mode that uses the energy harvested during the descent for achieving a soft landing. Even if harvesting of energy by the rotors during the rapid sent cannot generate sufficient energy to achieve a soft landing, the use of regulated energy harvesting may slow the UAV while maintaining a stable attitude sufficient to enable a hard but survival landing by the UAV.

FIG. 1 illustrates UAV flight paths and descent profiles, including a relief perspective view of a UAV 100, in accordance with various embodiments. With reference to the relief perspective view illustrated in FIG. 1, the UAV 100 may include a number of rotors 120, a frame 110, and landing columns 115 or skids. The frame 110 may provide structural support for the motors associated with the rotors 120. The landing columns 115 may be sufficiently strong to support the maximum load weight for the combination of the components of the UAV 100 and, in some cases, a payload. For ease of description and illustration, some detailed aspects of the UAV 100 are omitted such as wiring, frame structure interconnects or other features that would be known to one of skill in the art. For example, while the UAV 100 is shown and described as having a frame 110 having a number of support members or frame structures, the UAV 100 may be constructed using a molded frame in which support is obtained through the molded structure. In the illustrated embodiments, the UAV 100 has four rotors 120. However, more or fewer than four rotors 120 may be used.

Various embodiments may be implemented using a variety of UAV 100 configurations. A flight propulsion system for a UAV 100 may include one or more rotors 120 that generate a lifting force sufficient to lift the UAV 100 (including the UAV structure, motors, electronics, and power source) and any loads that may be attached to the UAV 100 (e.g., a payload). The flight propulsion system may be powered by an electrical power source such as a battery. Additionally, the flight propulsion system may include a supplemental-fueled motor, such as one or more internal combustion motors.

The flight propulsion system may be vertical or horizontally mounted depending on the flight mode of the UAV. A common UAV 100 configuration suitable for use in the various embodiments is a "quad copter" configuration. In an example quad copter configuration, typically four (or more or fewer) horizontally configured rotary lift propellers (i.e., rotors) and motors are fixed to a frame. The frame may include a frame structure with landing skids that supports the propulsion motors, power source (e.g., battery), payload securing mechanism, and so on. A payload may be attached (e.g., in a central area underneath the frame structure platform of the UAV 100), such as an area enclosed by the frame structure and skids underneath the flight power sources or propulsion units. A quad copter-style horizontal rotor may allow the UAV 100 to fly in any unobstructed horizontal and vertical direction or may hover in one place. A quad copter configuration is used for illustrative purposes in the examples described herein; however, other UAV designs may be used.

The UAV 100 may use differential thrust generated by the rotors 120 for control. For example, in a four-rotor design (i.e., a quad copter), all four rotors are generally used to generate sufficient thrust to fly. For example, decreasing thrust generated by two first neighboring rotors (e.g., the two top rotors 120 in the orientation shown in FIG. 1) and increasing thrust generated by the two second neighboring rotors opposed to the first (e.g., the two bottom rotors 120 in the orientation shown in FIG. 1) causes the UAV to pitch down on the side of the first neighboring rotors (i.e., generating less thrust). As a result of this pitch, a thrust vector drives the UAV 100 in the direction that the UAV pitched down. By changing the pairs of rotors that act in unison, in opposition, or a combination thereof, the UAV 100 may control roll and yaw in any direction. By ensuring the total motor power stays the same to maintain level flight, differential control may control the UAV's attitude without affecting total thrust up at. By controlling all rotors together, the UAV 100 may increase or decrease thrust, and thus change altitude. Ordinarily control is obtained by running all rotors "forward," resulting in a downward thrust that generates lift (including while hovering). Occasionally a rotor may be run "backwards" (i.e., reversing the rotor) to generate an upward thrust that may be used to make the UAV 100 descend.

The UAV 100 may be configured with computing devices that enable the UAV 100 to navigate, such as by controlling the flight motors to achieve flight directionality, and communication components that enable the UAV 100 to receive position information and information from external systems including servers, access points, other UAVs, and so on. The position information may be associated with the current position of the UAV 100, waypoints, flight paths, avoidance paths/sites, altitudes, destination sites, locations of known or potential charging/refueling sites, and/or the relative locations of other UAVs.

With reference to the graph illustrated in FIG. 1, a first flight path FP1 is shown representing a decision to land the UAV 100 in response to determining that a warning state of a battery has been reached. The warning state may represent a safety threshold of battery charge that has been reached below which it is not advisable to continue operating the UAV 100. For example, the warning state may correspond to 15% to 25% battery charge state (i.e., 15% to 25% of the full charge state). Whether the safety threshold is 15%, 25%, some percentage in between, or some other percentage may be determined based on a level of caution desired for operating the UAV 100, which may depend on the current mission, a payload, a pilot preference, a current location of the UAV, etc. In addition, a second flight path FP2 is shown representing a decision to operate using an extended flight protocol (i.e., in an extended flight mode) in accordance with various embodiments. Both the first flight path FP1 and the second flight path FP2 are illustrated initially having an altitude h above the ground. In various embodiments the UAV 100 may be configured to follow either the first flight path FP1, corresponding to cautious flight protocols, or the second flight path FP2, corresponding to the extended flight protocol.

The UAV 100 following the first flight path FP1 may have made a determination that the UAV battery reached the warning state, shortly before the UAV 100 had flown the first distance d1. In response to a decision not to use the extended flight protocol, the UAV 100 may immediately begin a steady descent, represented by the change in the first flight path FP1 at the first distance d1. In this first flight path FP1, the UAV 100 descends steadily at least until just before landing at the third distance d3. Just prior to landing, such as at the second distance d2, the UAV 100 may further slow its descent in order land gently. Although the UAV 100 following the first flight path FP1 was able to safely land after traveling the distance d3, the UAV 100 may have some remaining battery power left corresponding to the safety threshold established for the UAV 100.

In contrast, the UAV 100 following the second flight path FP2 may also have made a determination that the UAV battery reached the warning state shortly before the UAV 100 had flown the first distance d1. In response to a decision to use the extended flight protocol, the UAV 100 may maintain its previous course and altitude for an extended duration past the first distance d1. The extended flight protocol may allow the UAV 100 to ignore the safety threshold and continue flying with low-power reserves. Using the extended flight protocol, the UAV 100 may continue flying at any desired altitude, but may continue to monitor the state of the UAV battery, at least until an emergency-recovery state is reached. Thus, although the UAV 100 is illustrated as maintaining a constant altitude h, using the extended flight protocol the UAV 100 may change altitude, such as if needed to conserve power by avoiding turbulence or other conditions.

The emergency-recovery state may represent a zero level or near zero level of stored energy in the battery. The emergency-recovery state may be a preset level of power, a level of stored energy adjusted according to current conditions, a level of stored energy set by command signals from a remote source, or a combination thereof. In this way, the UAV 100 may be permitted to continue flying until the battery completely or almost completely runs out of stored energy. The UAV 100 using the extended flight protocol may thus be permitted to continue flying while the state of the battery is well below the warning state in order to extend a range of the UAV 100. Using the extended flight protocol, the UAV 100 may travel further than the first distance d2 or the second distance d3.

In various embodiments when operating using the extended flight protocol, the state of the UAV battery may continue to be monitored to enable the UAV 100 to activate an emergency recovery mode when the emergency-recovery state is reached. The fourth distance d4 along the second flight path FP2 represents the point at which the UAV 100 activates the emergency recovery mode. As part of the emergency recovery mode, a processor of the UAV may control the motors coupled to the rotors from drawing power from the battery for propulsion to harvesting energy from airflow. In other words, the rotors cease to generate lift, causing the UAV 100 to plummet (represented by the relatively sharp descent between the fourth distance d4 and a fifth distance d5).

During the descent of the emergency recovery mode, the rotors begin spinning in the opposite direction in the airflow as the UAV 100 descends. The motors coupled to the rovers are reconfigured to operate as generators, thereby harvesting energy from the airflow passing through the rotors. Using the rotors to generate electricity increases drag, which slows the rate of decent of the UAV 100. By varying the amount of energy that is harvested from each rotor, the amount of drag presented by each rotor can be controlled or adjusted, enabling the UAV 100 to control attitude during the rapid decent, and to a lesser extent, some directional control. The UAV 100 may continue to monitor altitude and the rate of descent as it plummets in the emergency recovery mode.

When a braking altitude b is reached, generally in close proximity to the ground, the UAV 100 may activate a braking mode. In the braking mode, the motors coupled to the rotors converted from generators harvesting energy to motors that apply the energy harvested and stored in the battery during the emergency recovery mode to generate thrust and slow the rate of descent of the UAV 100 to prepare for landing. The fifth distance d5 represents the point along the second flight path FP2 at which the braking mode was activated. Thus, the braking mode enables the UAV 100 to slow enough to land softly or at least more gently than a freefall. The sixth distance d6 represents the landing point along the second flight path FP2.

Figure 2:
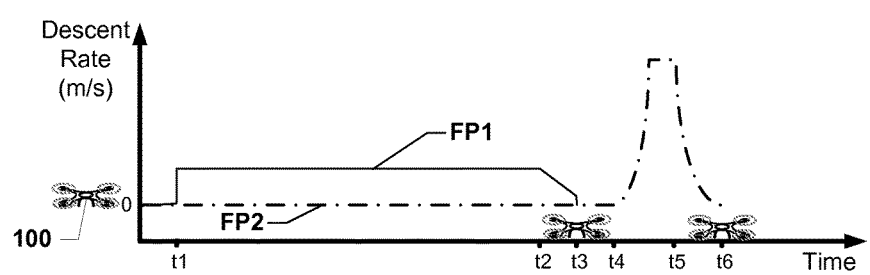
FIG. 2 is a chart of descent rate versus time comparing the two UAV flight paths of FIG. 1 according to various embodiments.

FIG. 2 illustrates the descent rate of UAV flight paths and descent profiles in accordance with various embodiments. Specifically, the graph illustrated in FIG. 2 illustrates descent rates at different points along the first flight path FP1 and the second flight path FP2. With reference to FIGS. 1-2, along the first flight path FP1 and the second flight path FP2, the UAV 100 is in level flight and thus have a zero descent rate as the UAV 100 maintaining a constant altitude (e.g., h). Upon reaching a first time t1 (corresponding to the first distance d1) the first flight path FP1 changes to a constant descent rate until the second time t2 (corresponding to the second distance d2). This constant descent rate reflects the straight line between the first distance d1 and the second distance d2. At the second time t2 along the first flight path FP1, the descent rate changes in order to slow down before landing at the third time t3 (corresponding to the third distance d3).

In contrast, the descent rate does not change along the second flight path FP2 upon reaching the first time t1. Instead, along the second flight path FP2 the descent rate remains unchanged until reaching the fourth time t4 (corresponding to the fourth distance d4) at which point the emergency recovery mode is entered. In some embodiments, at the fourth time t4 the descent rate sharply accelerates at least until the UAV 100 reaches terminal velocity (illustrated as occurring somewhere between the fourth time t4 and the fifth time t5), because the rotors have stop generating lift. Terminal velocity of the UAV 100 may depend upon the UAV mass and aerodynamic profile, as well as drag generated by the rotors by harvesting energy. If the UAV 100 is not falling from a sufficient altitude, terminal velocity may not be reached before the braking mode is initiated. The braking mode is illustrated as being initiated at the fifth time t5, after which the descent to rate of the UAV 100 is slowed dramatically until landing at the sixth time t6.

The UAV 100, the first flight path FP1, and the second flight path FP2 are schematic representations and not necessarily drawn to scale. Thus, each of the UAV sizes, the altitude, the distances, and the rates of descent represented therein may be greater than or less than what is illustrated. For example, relative to the altitude h, there may be a greater distance between the third distance d3 and the sixth distance d6. Generally, a difference between the first flight path FP1 and the second flight path FP2 may vary depending upon the safety thresholds used to establish each of the warning state and the emergency-recovery state of the UAV battery.

Figure 3:
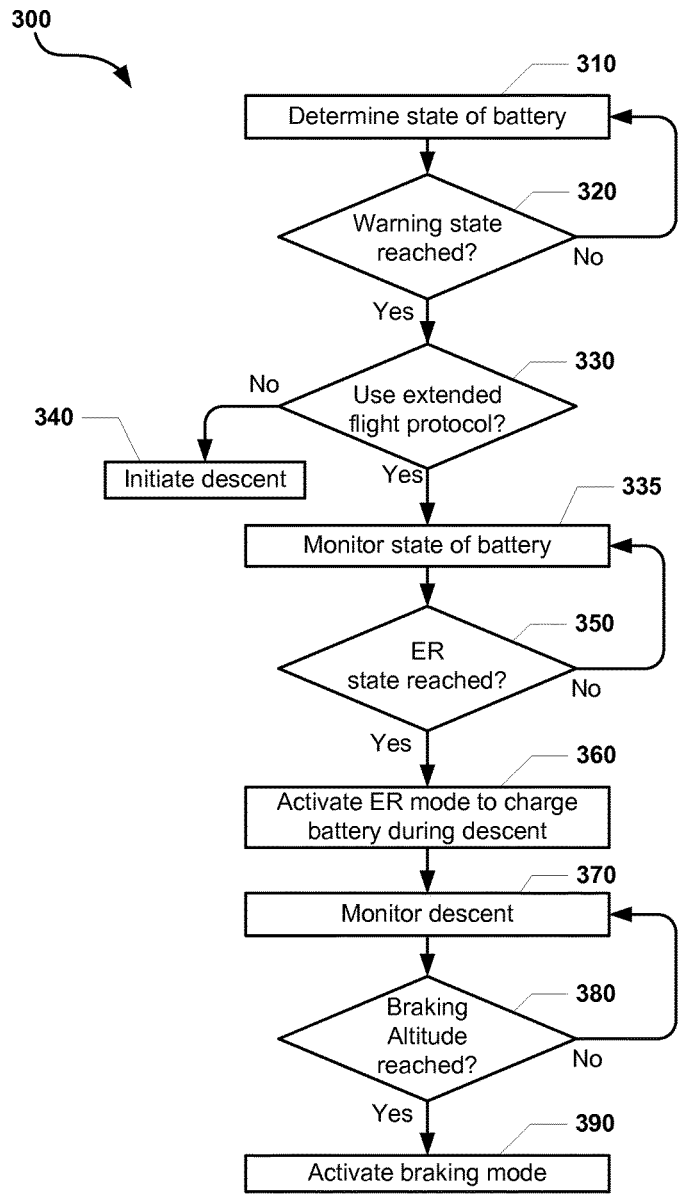
FIG. 3 is a process flow diagram illustrating a method of operating a UAV in a low-power state according to various embodiments.

FIG. 3 illustrates a method 300 of operating a UAV (e.g., 100 in FIGS. 1-2) that includes emergency recovery (ER) mode according to various embodiments. With reference to FIGS. 1-3, operations of the method 300 may be performed by a UAV control unit (e.g., 150) or other computing device (e.g., wireless communication device 500 in FIG. 5 and/or server 600 in FIG. 6) associated with the UAV 100.

In block 310, a processor (e.g., processor 160 (FIG. 4) in the control unit 150 or a processor in a wireless communication device) may determine a state of the UAV battery. The processor may continuously or periodically determine the state of the UAV battery, or do so in response to commands from a remote computing device (e.g., 500, 600). The UAV may periodically or continuously monitor available power and determine whether the UAV has enough power to continue operating normally.

Charge accumulators may be used to measure the current state of a battery by measuring how many coulombs the battery outputs. The charge accumulators may be configured so that a predetermined number of coulombs corresponding to a full battery (e.g., 3,000 ma-hrs.) or a lesser amount corresponds to one or more low-power warning levels. For example, when a charge accumulator indicates that a predetermined number of coulombs have been accumulated, the charge accumulator may indicate that the battery is depleted. Through calibration, the predetermined number of coulombs associated with a fully charged battery may be adjusted. Alternatively, voltage-based battery charge state measurement systems may be used to measure a voltage drop below a certain level and/or measure when the voltage drops at a particular rate to indicate how much energy remains stored in the battery.

In determination block 320, the processor may determine whether a warning state of a battery of the UAV has been reached. The warning state may represent a reserve stored energy threshold below which operation of the UAV should be discontinued and/or modified. One or more threshold levels of power (i.e., reserve stored energy thresholds) may be established for determining the warning state or other states of one or more batteries of the UAV have been reached (e.g., for triggering modes of operation that may enable the UAV to safely operate when onboard battery charge states are below safe-operation levels).

In various embodiments, the reserve stored energy thresholds may be a value associated with a predetermined percentage or quantity of onboard stored energy recommended be kept in reserve for a mission at various phases in the flight path (e.g., midway, when crossing a long remote or hazardous region, at the destination, before starting to land, etc.). Alternatively, the value of the reserve stored energy thresholds may be measured in terms of motor operating minutes or hours (i.e., a period of time that one or more motors can continue to be powered by the battery) or a flying distance/range that can be achieved by the energy stored in the battery. Higher reserve stored energy thresholds may be used for missions with more uncertainty regarding needed power. For example, risk factors from route parameters may increase the value of the reserve stored energy threshold specified for a mission. A total mission energy requirement may include an amount of energy reflected by the reserve stored energy threshold, in addition to projected energy expenditures for the mission.

Reserve stored energy threshold may also be influenced by other factors, such as payload encumbrances, deadlines, and/or priorities. Payload encumbrances may reflect the weight and size of a payload, including dimensions thereof. An oddly shaped or large payload may affect the aerodynamics of the UAV, which may be taken into account in determining the power stores needed for a mission. A deadline may reflect a completion time or date for a mission. Priorities may reflect an order in which missions should be accomplished and/or a value or perishable nature of a payload. For example, certain payloads that are too valuable (i.e., are assessed as having too high a value) or are perishable may need to avoid stops, such as for stationary energy harvesting. Similarly, high value payload may need to avoid interactions with humans or creatures that might compromise the payload.

In various embodiments, one reserve stored energy threshold may be the warning state of the battery, which is a predetermined level of power suggested for ending or quickly concluding normal operation of the UAV. Once the warning state is reached, the UAV may initiate landing in accordance with a normal cautious operating protocol. In this way, the warning state may include or take into account a threshold level of reserve energy allowing for a margin of error. In addition, the warning state may take into account information about payload encumbrances, route parameters, conditions that effect power consumption (e.g., temperature, altitude, humidity, inclement weather, etc.), priority levels, and other information about one or more missions assigned to the UAV.

In response to determining that the warning state of the battery has not been reached (i.e., determination block 320="No"), the processor may determine a new (i.e., most current) state of the battery in block 310.

In response to determining that the warning state has been reached (i.e., determination block 320="Yes"), the processor may determine whether to use an extended flight protocol in determination block 330. The extended flight protocol may allow the UAV to ignore default safety thresholds (which may be conservative) and continue flying with low-power reserves. Using the extended flight protocol, the UAV may continue flying at altitude, but may continue to monitor the state of the UAV battery at least until an emergency-recovery state is reached.

The determination of whether to use the extended flight protocol may be based on (but not limited to) predetermined settings of the UAV, current mission parameters, remote input, or a combination thereof. The remote input may be received from an operator of the UAV or automatically from a remote computing device. The operator may be prompted after receiving an indication that the warning state of the battery has been reached. In response thereto, the operator may transmit a command that controls whether the UAV uses the extended flight protocol.

In response to determining that the UAV should not use the extended flight protocol (i.e., determination block 330="No"), the UAV may start a landing procedure, such as initiating a descent in block 340. Landing procedures may include signaling and flight system changes (e.g., changes to control surface or deployment of landing gear).

In response to determining that the UAV should use the extended flight protocol (i.e., determination block 330="Yes"), the processor may begin monitoring the state of the battery in block 335 to detect when an emergency-recovery state has been reached. Meanwhile, the UAV may continue to fly at altitude.

In determination block 350, the processor may determine whether an emergency-recovery (ER) state has been reached. As with determining whether the warning state has been reached in determination block 320, determining whether the emergency-recovery state has been reached may be based on a measured output or output rate of the onboard battery. The emergency-recovery state may be a predetermined level of battery charge of the onboard battery. For example, the emergency-recovery state may correspond to a measured zero level of power (e.g., the coulomb counter counts down to zero) or a near-zero value. In some embodiments, the emergency-recovery state may be detected by determining that the motors are drawing 100% or some other predetermined percentage of the power rating of the battery (i.e., less than 100%) but the UAV is consistently losing altitude.

In some embodiments, the emergency-recovery state may be recognized as a condition in which the energy stored in the battery of the UAV is insufficient to power the rotors to maintain lift. In some embodiments, the emergency-recovery state may correspond to a minimum level of energy stored in the battery that is needed to land the UAV. The minimum level of energy stored in the battery needed to land the UAV may take into account energy that may be harvested by the rotors during a rapid descent. For example, an estimate may be made of a total amount of electrical energy that will be needed to land the UAV (including energy used by the avionics during the descent and landing maneuvers), and an estimate may be made of an amount of energy the UAV may harvest from the rotors turning during the descent.

In some embodiments, either the warning state or the emergency-recovery state may change under certain circumstances. In this way, the safety thresholds used to define the warning state and/or the emergency-recovery state may be different or be changed to account for real-world conditions. For example, over no-recovery zones or regions in which landing is not desirable or there is no safe landing zone, the warning state and/or the emergency-recovery state may need to be set higher than normal in order to ensure that sufficient energy is stored in the battery to enable the UAV to reach a safe landing even using energy harvesting during an emergency recovery maneuver.

In response to determining that the emergency-recovery state has not been reached (i.e., determination block 350="No"), the processor may continue monitoring the state of battery charge in block 335. In response to determining that the emergency-recovery state has been reached (i.e., determination block 350="Yes"), the processor may activate an emergency recovery (ER) mode in block 360.

During the emergency recovery mode in block 360, the UAV may be permitted to descend rapidly as the rotors are converted from generating lift to harvesting energy. As described, using the rotors to harvest energy creates drag, and regulating an amount of energy that is harvested from each rotor adjusts the amount of drag generated by each rotor. Thus, the flight control system of the UAV may be configured to regulate the amount of energy harvested by each rotor in order to control attitude to maintain a stable attitude and prevent tumbling. The flight control laws used to maintain a stable attitude during the emergency recovery mode may be similar to the control laws used to maintain flight attitudes during powered flight, except that the control laws may be reversed. For example, a roll in powered flight is accomplished by increasing power applied to one or more rotors in order to increase thrust, but the same role in the emergency recovery mode is accomplished by harvesting more power from the same rotor(s) in order to increase drag.

Various embodiments recover energy during the emergency recovery mode as part of an emergency descent that harvests power for landing. In the emergency recovery mode, the rotors may be allowed to be turned by the airstream flowing by the UAV as the UAV falls. The rotors turn the motors that are switched from drawing power from the battery for propulsion to generating electricity, thereby harvesting energy from the airstream. In the emergency recovery mode, the UAV may also turn off power to non-essential circuits, thereby conserving more energy stored in the onboard battery. In addition, energy from the freewheeling rotors may be stored as electrical energy in the onboard battery.

The voltage generated by the motors coupled with the rotors may be determined by a speed of the motors, which is determined by the descent rate (which determines the speed of the airstream). Thus, the rate of descent of the UAV may increase until the output voltage of the motors matches the charging voltage of the battery. At that point, the motors may power the UAV electronics and begin recharging the battery. Generating electricity causes a force on the rotors that will cause the rotors to maintain a constant rotation rate, which will result in a certain level of drag. The drag will slow the descent of the UAV, and regulating the amount of energy generated by each rotor can control the amount of drag produced by each rotor as described.

In various embodiments, the UAV may be configured to switch the motors coupled to the rotors from drawing power from the battery to generating electricity for charging the battery. In some embodiments, this may be accomplished by controlling a three-phase H-bridge drive within or coupled to each motor. Specifically, the motors can be configured to generate electricity for charging the battery by shorting all of the "bottom" FETs of the H-bridge drive via a pulse wave modulated (PWM) signal. The amount of electricity generated, and thus the amount of harvested energy and drag created by each rotor, may be controlled by adjusting the duty cycle of the PWM signal. For example, a short duty cycle PWM signal may result in a small amount of energy generated by the motor, while a long duty cycle PWM signal may result in a larger amount of energy generated by the motor. By varying the duty cycle of the PWM signal applied to each motor in this manner, the amount of energy stored in the battery and the amount of drag created by each rotor can be varied. A controller may be used to control the duty cycle of the PWM signal applied to each rotor in order to control the relative drag produced by each rotor to produce a desired control response (e.g., to maintain attitude during the descent), while providing sufficient recharge power to the battery to enable the braking maneuver.

In block 370, the processor of the UAV may monitor the descent of the UAV, which may include determining a descent profile. The descent profile may define how the UAV will affect an emergency recovery landing. Thus, the descent profile may take into account information such as characteristics of the UAV (a UAV mass, drag coefficients, and other aerodynamic elements). Also, the descent profile may take into account a current UAV altitude and/or UAV velocity. For example, based on the current altitude the descent profile may determine a braking altitude corresponding to when the UAV needs to start braking in order to land effectively. Alternatively, the descent profile may indicate only drag braking will be applied during the descent because the UAV is not high enough to harvest enough energy for thrust braking. In addition, the descent profile may include information for navigating the UAV during some parts of the UAV's descent to a designated the landing site.

Changes to the UAV, its payload, mission requirements, or information regarding landing sites may require the processor to review and determine mission parameters as part of determining the descent profile. Descent profiles for one or more circumstances may be received before the UAV takes flight, during a flight (i.e., between locations), after landing at one site but before a subsequent flight, or other suitable time.

In determining a descent profile, the processor may use a preprogrammed assessment technique, which may include an inference engine that combines, fuses, and/or weighs relevant data (e.g., real-time, non-real time, or a combination thereof) for making the assessment. In various embodiments, the inference engine may combine or fuse real-time and/or non-real time data associated with altitude, UAV mass, UAV drag coefficients, current velocity including descent rate, available battery charge and/or the landing site data in order to determine the descent profile. Based on the assessment, the processor may select the best available descent profile, when more than one option is available. Thus, the processor may not only use information associated with temporal parameters, environment, risk, and potential landing sites, but may also consider the availability of information and the credibility of information available in determining the descent profile.

In assessing the suitability of potential landing sites, the processor may consider how far a site may be from the UAV, how safe the site may be, or whether a soft landing area is available at the landing site. One or more visual images of a landing site may be retrieved from an onboard memory or received from a remote input as part of landing site data, which may be analyzed for assessing the suitability of the landing site. Also, landing site data compiled from a prior UAV visit to one or more sites may be analyzed for assessing the suitability of the landing site. Further, assessing the suitability of a landing site may include determining whether at least one other UAV is currently located at a particular landing site or whether the landing site is not clear for landing (e.g., too crowded with other UAVs).

Landing site selection may include a rooftop, which may mean a lower landing/impact velocity. Commercial buildings may provide advantages for safe landing. For example, tenants do not generally frequent commercial building rooftops, which means humans will not tend to disturb the UAV 100 while the UAV 100 is on the rooftop. The advantages provided by any particular landing site may be weighed to determine whether that site is suitable and/or preferred to other available sites. Sites other than commercial building may be considered for landing. For example, in areas that are more rural, an open field may be selected as a landing site. In the event the UAV 100 lands before reaching an intended destination, the UAV 100 may be configured to do so in an area that will be least likely to endanger humans or damage property, and/or in an area where the UAV 100 may be easily retrieved, and so on. The UAV 100 may use signals from global navigation system satellites to determine progress toward a landing site. Alternatively, the landing sites may be officially designated sites, such as ones that provide added features (e.g., custom platforms, cushions, catch systems, or the like).

Data related to the landing site may be accessed by the UAV 100 from an onboard source (e.g., memory 161, input module 180, or sensors 182 in FIG. 4) or a remote source (e.g., wireless communication device 500 in FIG. 5 and/or server 600 in FIG. 6). In addition, the landing site data from a remote source may originate from other UAVs, from sensors at the landing site, or from reports by the UAV 100 from previous visits to the landing site. For example, the server may provide general information about the coordinates of the landing site or details about the landing site, such as whether a cushioning landing pad is available. In addition, onboard sensors may provide more detailed landing site data about the optimal location to land at the landing site.

The UAV 100 may also use preferences or predicted variables that influence the descent profile determination. For example, the UAV 100 may be programmed with a preference for drag braking only (e.g., to maximize the UAV's range) or landing at landing sites customize with particular equipment.

In determination block 380, the processor may determine whether a braking altitude has been reached. The braking altitude may represent an aerial elevation at which the braking mode should be activated in accordance with the determination profile determined in block 370. The braking altitude may depend upon a number of factors, and thus may be different for each circumstance. For example, the braking altitude will depend upon the rate of descent and momentum (which depends upon the vehicle and payload mass) of the UAV. Also, factors affecting the lift, such as temperature, altitude and humidity, may be taken into account in determining the altitude at which braking must begin in order to bring the UAV to a stop before it hits the ground. Thus, as part of block 370 and/or determination block 380, the processor of the UAV may make a calculation to determine the appropriate braking altitude under the current circumstances. In some embodiments, this may involve making a direct calculation using measured and stored values. In some embodiments, this determination may involve a table lookup using the measured and stored values.

Until braking altitude has been reached (i.e., while determination block 380="No"), the processor may continue to monitor the descent and/or the descent profile in block 370.

In response to determining that the braking altitude has been reached (i.e., determination block 380="Yes"), the processor may activate the braking mode in block 390. As part of the braking mode, the UAV may revert to its standard control laws, and apply the energy stored in the battery during the emergency recovery mode descent to the rotors to generate sufficient thrust to decelerate and land. If done at a low altitude this may require less energy than was harvested during the descent, allowing a soft landing of the drone. Alternatively, in the braking mode the UAV may apply maximum drag on all rotors by maximizing the amount of energy harvested by each rotor, reducing the descent speed to allow a safe (but relatively hard) landing. As a further alternative braking mode may include a combination of phases that use drag braking and thrust braking separately and/or together.

Figure 4:
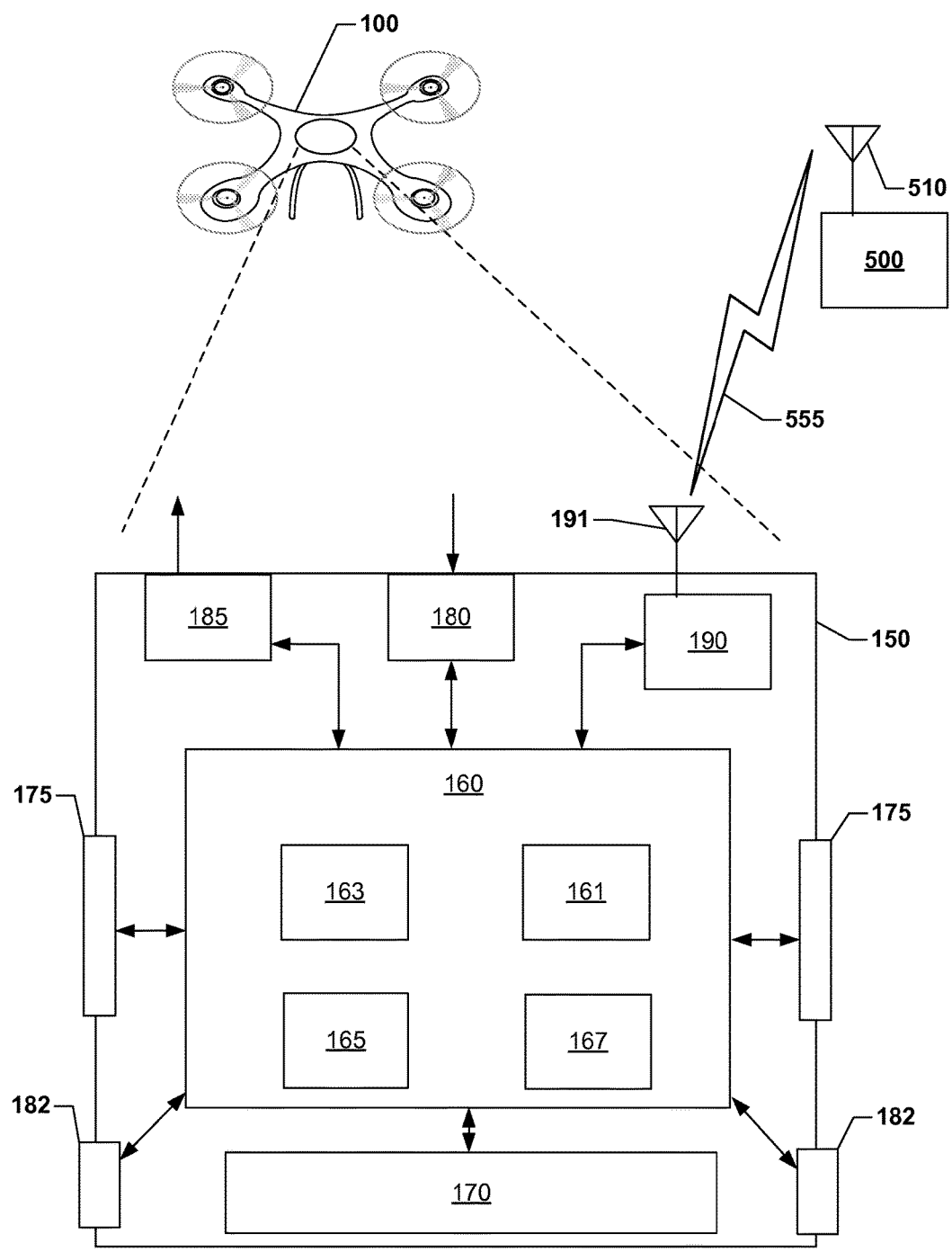
FIG. 4 is a perspective view of a UAV and a schematic relief diagram of a control unit and remote communication device according to various embodiments.

FIG. 4 illustrates the UAV 100 the may be used with various embodiments. With reference to FIGS. 1-4, the UAV 100 may include a control unit 150 that may house various circuits and devices used to power and control the operation of the UAV 100. The control unit 150 may include a processor 160, a power module 170, payload-securing units 175, an input module 180, sensors 182, an output module 185, and a radio module 190. The processor 160 may include or be coupled to memory 161 and a navigation unit 163. The processor 160 may be configured with processor-executable instructions to control flight and other operations of the UAV 100, including operations of the various embodiments. The processor 160 may be coupled to one or more payload-securing units 175 and sensors 182. The payload-securing units 175 may include an actuator motor that drives a grip and release mechanism and related controls that are responsive to the control unit 150 to grip and release a payload in response to commands from the control unit 150.

The sensors 182 may be optical sensors, radio sensors, a camera, or other sensors. Alternatively or additionally, the sensors 182 may be contact or pressure sensors that may provide a signal that indicates when the UAV 100 has landed. The power module 170 may include one or more batteries that may provide power to various components, including the processor 160, the payload-securing units 175, the input module 180, the sensors 182, the output module 185, and the radio module 190. In addition, the power module 170 may include energy storage components, such as rechargeable batteries. In this way, the processor 160 may be configured with processor-executable instructions to control the charging of the power module 170 (i.e., the storage of energy harvested from the airflow during an emergency recovery mode descent), such as by executing a charging control algorithm using a charge control circuit. Alternatively or additionally, the power module 170 may be configured to manage its own charging. The processor 160 may be coupled to an output module 185, which may output control signals for managing the motors that drive the rotors 120 and other components.

Through control of the individual motors of the rotors 120, the UAV 100 may be controlled in flight as the UAV progresses toward a destination and/or operates in various modes (e.g., the emergency recovery mode or the braking mode). The processor 160 may receive data from the navigation unit 163 and use such data in order to determine the present position and orientation of the UAV 100, as well as the appropriate course towards the destination or landing sites. In various embodiments, the navigation unit 163 may include a global navigation satellite system (GNSS) receiver system (e.g., one or more Global Positioning System (GPS) receivers) enabling the UAV 100 to navigate using GNSS signals. Alternatively or in addition, the navigation unit 163 may be equipped with radio navigation receivers for receiving navigation beacons or other signals from radio nodes, such as navigation beacons (e.g., very high frequency (VHF) Omni Directional Radio Range (VOR) beacons), Wi-Fi access points, cellular network sites, radio station, remote computing devices, other UAVs, etc.

The processor 160 and/or the navigation unit 163 may be configured to communicate with a server through a wireless connection (e.g., a cellular data network) to receive commands to use or stop using the extended flight protocol, receive data useful in navigation, provide real-time position altitude reports, and assess data. An avionics module 167 coupled to the processor 160 and/or the navigation unit 163 may be configured to provide flight control-related information such as altitude, attitude, airspeed, heading and similar information that the navigation unit 163 may use for navigation purposes, such as dead reckoning between GNSS position updates. The avionics module 167 may include or receive data from a gyro/accelerometer unit 165 that provides data regarding the orientation and accelerations of the UAV 100 that may be used in navigation and positioning calculations.

The radio module 190 may be configured to receive signals, such as command signals to initiate, continue, or discontinue the use of the extended flight protocol, receive signals from aviation navigation facilities, etc., and provide such signals to the processor 160 and/or the navigation unit 163 to assist in UAV operation. In various embodiments, the navigation unit 163 may use signals received from recognizable RF emitters (e.g., AM/FM radio stations, Wi-Fi access points, and cellular network base stations) on the ground. The locations, unique identifiers, signal strengths, frequencies, and other characteristic information of such RF emitters may be stored in a database and used to determine position (e.g., via triangulation and/or trilateration) when RF signals are received by the radio module 190. Such a database of RF emitters may be stored in the memory 161 of the UAV 100, in a ground-based server in communication with the processor 160 via a wireless communication link, or in a combination of the memory 161 and a ground-based server.

Navigating using information about RF emitters may use any of a number of conventional methods. For example, upon receiving an RF signal via the radio module 190, the processor 160 may obtain the signal's unique identifier (e.g., a service sector identification (SSID), a media access control (MAC) address, radio station call sign, cell ID, etc.), and use that information to obtain the ground coordinates and signal strength of the detected RF emitter from the database of RF emitter characteristics. If the database is stored in the memory 161, the processor 160 may use the emitter identifier information to perform a table look up in the database. Alternatively or in addition, the processor 160 may use the radio module 190 to transmit the detected RF emitter identifier to a Location Information Service (LIS) server, which may return a location of the RF emitter obtained an RF emitter location database. Using the RF emitters' coordinates and optionally the signal strength characteristics, the processor 160 (or the navigation unit 163) may estimate the location of the UAV 100 relative to those coordinates. Using locations of three or more RF emitters detected by the radio module 190, the processor may determine a more precise location via trilateration. Estimates of location based on received ground-based RF emitters may be combined with position information from a GNSS receiver to provide more precise and reliable location estimates than achievable with either method alone.

The processor 160 may use the radio module 190 to conduct wireless communications with a variety of wireless communication devices 500, such as a beacon, server, smartphone, tablet, or other computing device with which the UAV 100 may be in communication. A bi-directional wireless communication link provided by wireless signals 555 may be established between a transmit/receive antenna 191 of the radio module 190 and a wireless communication device antenna 510 (i.e., a transmit/receive antenna) of the wireless communication device 500. Alternatively or additionally, the wireless signals 555 may communicate with a cellular network base station or cell tower. The radio module 190 may be configured to support multiple connections with different wireless communication devices 500 having different radio access technologies. In various embodiments, the wireless communication device 500 may be connected to a server through intermediate access points. In an example, the wireless communication device 500 may be a server of a UAV operator, a third party service (e.g., package delivery, billing, etc.), or a site communication access point. The UAV 100 may communicate with a server through one or more intermediate communication links, such as one or more network nodes or other communication devices.

The UAV 100 may receive signals from wireless communication devices 500 through wireless signals 555 as the UAV 100 is in midflight, such as while in normal, extended flight, emergency recovery, and/or braking modes. The wireless signals 555 may provide information about descent profiles, emergency recovery parameters, location information, and/or landing site.

In various embodiments, the radio module 190 may be configured to switch between a cellular connection and a Wi-Fi or other form of radio connection depending on the location and altitude of the UAV 100. For example, while in flight at an altitude designated for UAV traffic, the radio module 190 may communicate with a cellular infrastructure in order to maintain communications with a server. An example of a flight altitude for the UAV 100 may be at around 400 feet or less, such as may be designated by a government authority (e.g., FAA) for UAV flight traffic. At this altitude, it may be difficult to establish communication with some of the wireless communication devices 500 using short-range radio communication links (e.g., Wi-Fi). Therefore, communications with other wireless communication devices 500 may be established using cellular telephone networks while the UAV 100 is at flight altitude. Communication between the radio module 190 and the wireless communication device 500 may transition to a short-range communication link (e.g., Wi-Fi or Bluetooth) when the UAV 100 moves closer to the wireless communication device 500. Similarly, the UAV 100 may include and employ other forms of radio communication, such as mesh connections with other UAVs or connections to other information sources (e.g., balloons or other stations for collecting and/or distributing weather or other data harvesting information).

In various embodiments, the control unit 150 may be equipped with the input module 180, which may be used for a variety of applications. For example, the input module 180 may receive images or data from an onboard camera or sensor, or may receive electronic signals from other components (e.g., a payload). The input module 180 may receive an activation signal for causing actuators on the UAV to deploy landing cushions or similar components for affecting an emergency landing. In addition, the output module 185 may be used to activate components (e.g., an energy cell, an actuator, an indicator, a circuit element, a sensor, and/or an energy-harvesting element).

While the various components of the control unit 150 are illustrated in FIG. 4 as separate components, some or all of the components (e.g., the processor 160, the output module 185, the radio module 190, and other units) may be integrated together in a single device or module, such as a system-on-chip module.

In various embodiments, communication with the UAV 100 may be implemented using any of a variety of wireless communication devices (e.g., smartphones, tablets, smartwatches, etc.) an example of which is illustrated in FIG. 5. The wireless communication device 500 may include a processor 502 coupled with the various systems of the wireless communication device 500 for communication with and control thereof. For example, the processor 502 may be coupled to a touch screen controller 504, radio communication elements, speakers and microphones, and an internal memory 506. The processor 502 may be one or more multi-core integrated circuits designated for general or specific processing tasks. The internal memory 506 may be volatile or non-volatile memory, and may also be secure and/or encrypted memory, or unsecure and/or unencrypted memory, or any combination thereof. In another embodiment (not shown), the wireless communication device 500 may also be coupled to an external memory, such as an external hard drive.

The touch screen controller 504 and the processor 502 may also be coupled to a touch screen panel 512, such as a resistive-sensing touch screen, capacitive-sensing touch screen, infrared sensing touch screen, etc. Additionally, the display of the wireless communication device 500 need not have touch screen capability. The wireless communication device 500 may have one or more radio signal transceivers 508 (e.g., Peanut, Bluetooth, Bluetooth LE, ZigBee, Wi-Fi®, radio frequency (RF) radio, etc.) and antennae, the wireless communication device antenna 510, for sending and receiving communications, coupled to each other and/or to the processor 502. The radio signal transceivers 508 and the wireless communication device antenna 510 may be used with the above-mentioned circuitry to implement the various wireless transmission protocol stacks and interfaces. The wireless communication device 500 may include a cellular network wireless modem chip 516 coupled to the processor that enables communication via a cellular network.

The wireless communication device 500 may include a peripheral device connection interface 518 coupled to the processor 502. The peripheral device connection interface 518 may be singularly configured to accept one type of connection, or may be configured to accept various types of physical and communication connections, common or proprietary, such as USB, FireWire, Thunderbolt, or PCIe. The peripheral device connection interface 518 may also be coupled to a similarly configured peripheral device connection port (not shown).

In various embodiments, the wireless communication device 500 may include one or more microphones 515. For example, the wireless communication device may have microphones 515 that are conventional for receiving voice or other audio frequency energy from a user during a call.

The wireless communication device 500 may also include speakers 514 for providing audio outputs. The wireless communication device 500 may also include a housing 520, constructed of a plastic, metal, or a combination of materials, for containing all or some of the components discussed herein. The wireless communication device 500 may include a power source 522 coupled to the processor 502, such as a disposable or rechargeable battery. The rechargeable battery may also be coupled to the peripheral device connection port to receive a charging current from a source external to the wireless communication device 500. The wireless communication device 500 may also include a physical button 524 for receiving user inputs. The wireless communication device 500 may also include a power button 526 for turning the wireless communication device 500 on and off.

In various embodiments, the wireless communication device 500 may further include an accelerometer 528, which senses movement, vibration, and other aspects of the device through the ability to detect multi-directional values of and changes in acceleration. In the various embodiments, the accelerometer 528 may be used to determine the x, y, and z positions of the wireless communication device 500. Using the information from the accelerometer, a pointing direction of the wireless communication device 500 may be detected.

Various forms of computing devices may be used to communicate with a processor of a UAV, including personal computers, wireless communication devices (e.g., smartphones, etc.), servers, laptop computers, etc., to implement the various embodiments including the embodiments described with reference to FIGS. 1-6. Such computing devices may typically include, at least, the components illustrated in FIG. 6, which illustrates an example server computing device. With reference to FIGS. 1-6, the server 600 may typically include a processor 601 coupled to volatile memory 602 and a large capacity nonvolatile memory, such as a disk drive 603. The server 600 may also include a floppy disc drive, compact disc (CD) or DVD disc drive 606 coupled to the processor 601. The server 600 may also include network access ports 604 (or interfaces) coupled to the processor 601 for establishing data connections with a network 605, such as the Internet and/or a local area network coupled to other system computers and servers. Similarly, the server 600 may include additional access ports, such as USB, Firewire, Thunderbolt, and the like for coupling to peripherals, external memory, or other devices.

In various embodiments, the UAV (e.g., 100) may be configured to periodically check the functioning of the navigation unit (e.g., 163) and/or communication links with the server 600. Such functionality may be checked through a periodic heart beat check. For example, the UAV may receive periodic communications from the server 600 indicating that a wireless connection is still maintained and viable. Alternatively or in addition, the UAV may send periodic communications to the server 600 providing current location coordinates of the UAV and/or indicating that the navigation unit and other UAV systems are still functioning. If the processor (e.g., 160) of the UAV determines that the navigation unit and other UAV systems are not functioning, corrective action may be taken. For example, in the event the UAV loses contact with an information source or other communication link, such as due to jamming, pirate signals, masking by buildings, or tampering of the UAV, and the UAV has no other way to determine location, the UAV may issue an alert to the server 600 and land. During such a landing, the UAV may exploit the emergency recovery mode harvesting, if conditions warrant. In this way, the UAV may autonomously determine a descent profile, including identification of impromptu potential landing sites, or use information it already has to locate designated landing site.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of operating an unmanned aerial vehicle (UAV) using rotors for propulsion, the method comprising:
   determining, in a processor while the UAV is flying, whether an emergency-recovery state of a battery of the UAV has been reached, wherein:
   the emergency-recovery state is a battery charge state in which the battery has insufficient energy stored therein to enable the UAV to conduct a normal landing from a current altitude; and
   the emergency-recovery state is defined by a total amount of stored energy needed to land the UAV minus an amount of energy estimated to be harvested by the rotors during the emergency recovery mode before reaching a braking altitude;

activating an emergency recovery mode in response to determining that the emergency-recovery state has been reached, wherein the emergency recovery mode switches the rotors from drawing power from the battery for generating propulsion to harvesting energy from airflow that is used to recharge the battery;

determining, in the processor, whether the braking altitude has been reached; and activating a braking mode in response to determining the braking altitude has been reached, wherein the braking mode switches the rotors from energy harvesting to drawing power from the battery to generate propulsion in order to reduce a descent rate of the UAV.

2. The method of claim 1, wherein the braking mode includes regulating an amount of energy generated by the rotors in order to adjust an amount of drag generated by each rotor in order to control UAV attitude.

3. The method of claim 1, further comprising:
receiving, in the processor, a signal commanding the UAV to use an extended flight protocol that includes the emergency recovery mode.

4. The method of claim 1, wherein the emergency-recovery state is a battery charge state in which the battery has insufficient energy stored therein to enable the UAV to maintain level flight.

5. The method of claim 1, wherein the emergency-recovery state is measured from a voltage level of the battery.

6. The method of claim 1, wherein the emergency-recovery state is a predetermined rate of change of a stored energy capacity of the battery.

7. The method of claim 1, further comprising:
determining, in the processor while the UAV is flying, whether a warning state of the UAV has been reached, wherein the warning state is a battery charge state in which the battery has stored a predetermined percentage of a maximum stored energy of the battery and provides an indication that the UAV should initiate a landing;
detecting whether the UAV should use an extended flight protocol in response to determining that the warning state of the UAV has been reached; and
maintaining the rotors in an energy consumption mode for propulsion in response to determining that the UAV should use the extended flight protocol.

8. The method of claim 1, wherein the emergency recovery mode comprises using at least one motor controlling at least one of the rotors to maintain a stable attitude by regulating an amount of energy generated by the at least one motor in order to adjust an amount of drag generated by the rotors.

9. An unmanned aerial vehicle (UAV), comprising:
a battery;
a rotor configured to be able to draw power from the battery to generate propulsion and to harvest energy from airflow to recharge the battery;
means for determining whether an emergency-recovery state of a battery of the UAV has been reached while the UAV is flying, wherein:
the emergency-recovery state is a battery charge state in which the battery has insufficient energy stored therein to enable the UAV to conduct a normal landing from a current altitude; and
the emergency-recovery state is defined by a total amount of stored energy needed to land the UAV minus an amount of energy estimated to be harvested by the rotors during the emergency recovery mode before reaching a braking altitude;
means for activating an emergency recovery mode in response to determining that the emergency-recovery state has been reached, wherein the emergency recovery mode switches the rotor from drawing power from the battery for generating propulsion to harvesting energy from airflow that is used to recharge the battery;
means for determining whether the braking altitude has been reached; and
means for activating a braking mode in response to determining the braking altitude has been reached, wherein the braking mode switches the rotor from energy harvesting to drawing power from the battery to generate propulsion in order to reduce a descent rate of the UAV.

10. An unmanned aerial vehicle (UAV), comprising:
a rotor;
a motor configured to drive the rotor for propulsion;
a battery configured to supply power to the motor; and
a processor couple to the battery and configured with processor-executable instructions to:
determine whether an emergency-recovery state of the battery has been reached while the UAV is flying, wherein:
the emergency-recovery state is a battery charge state in which the battery has insufficient energy stored therein to enable the UAV to conduct a normal landing from a current altitude; and
the emergency-recovery state is defined by a total amount of stored energy needed to land the UAV minus an amount of energy estimated to be harvested by the rotors during the emergency recovery mode before reaching a braking altitude;
activate an emergency recovery mode in response to determining that the emergency-recovery state has been reached, wherein the emergency recovery mode switches the rotor from drawing power from the battery for generating propulsion to harvesting energy from airflow that is used to recharge the battery;
determining whether the braking altitude has been reached; and
activating a braking mode in response to determining the braking altitude has been reached, wherein the braking mode switches the rotor from energy harvesting to drawing power from the battery to generate propulsion in order to reduce a descent rate of the UAV.

11. The UAV of claim 10, wherein the processor is configured with the processor-executable instructions such that the braking mode includes regulating an amount of energy generated by the rotor in order to adjust an amount of drag generated by the rotor in order to control UAV attitude.

12. The UAV of claim 10, wherein the processor is further configured with the processor-executable instructions to:
receive a signal commanding the UAV to use an extended flight protocol that includes the emergency recovery mode.

13. The UAV of claim 10, wherein the processor is configured with the processor-executable instructions such that the emergency recovery mode comprises using at least one motor controlling at least one of the rotor to maintain a stable attitude by regulating an amount of energy generated by the at least one motor in order to adjust an amount of drag generated by the rotor.

14. The UAV of claim 10, wherein the processor is configured with the processor-executable instructions such that the emergency-recovery state is a battery charge state in which the battery has insufficient energy stored therein to enable the UAV to maintain level flight.

15. The UAV of claim 10, wherein the processor is configured with the processor-executable instructions such that the emergency-recovery state is measured from a voltage level of the battery.

16. The UAV of claim 10, wherein the processor is configured with the processor-executable instructions such that the emergency-recovery state is a predetermined rate of change of a stored energy capacity of the battery.

17. The UAV of claim 10, wherein the processor is further configured with the processor-executable instructions to:
   determine whether a warning state of the UAV has been reached while the UAV is flying, wherein the warning state is a battery charge state in which the battery has stored a predetermined percentage of a maximum stored energy of the battery and provides an indication that the UAV should initiate a landing;
   detect whether the UAV should use an extended flight protocol in response to determining that the warning state of the UAV has been reached; and
   maintain the rotor in an energy consumption mode for propulsion in response to determining that the UAV should use the extended flight protocol.

18. A non-transitory processor-readable storage medium having stored thereon processor-executable instructions configured to cause a processor of an unmanned autonomous vehicle (UAV) to perform operations comprising:
   determining whether an emergency-recovery state of a battery of the UAV has been reached while the UAV is flying, wherein:
      the emergency-recovery state is a battery charge state in which the battery has insufficient energy stored therein to enable the UAV to conduct a normal landing from a current altitude; and
      the emergency-recovery state is defined by a total amount of stored energy needed to land the UAV minus an amount of energy estimated to be harvested by the rotors during the emergency recovery mode before reaching a braking altitude;
   activating an emergency recovery mode in response to determining that the emergency-recovery state has been reached, wherein the emergency recovery mode switches a rotor of the UAV from drawing power from the battery for generating propulsion to harvesting energy from airflow that is used to recharge the battery;
   determining whether the braking altitude has been reached; and
   activating a braking mode in response to determining the braking altitude has been reached, wherein the braking mode switches the rotor from energy harvesting to drawing power from the battery to generate propulsion in order to reduce a descent rate of the UAV.

19. The non-transitory processor-readable storage medium of claim 18, wherein the stored processor-executable instructions are configured to cause the processor to perform operations such that the emergency-recovery state is a battery charge state in which the battery has insufficient energy stored therein to enable the UAV to maintain level flight.

20. The non-transitory processor-readable storage medium of claim 18, wherein the stored processor-executable instructions are configured to cause the processor to perform operations such that the emergency-recovery state is selected from a group consisting of:
   a battery charge state in which the battery has insufficient energy stored therein to enable the UAV to maintain level flight;
   measured from a voltage level of the battery; and
   a predetermined rate of change of a stored energy capacity of the battery.

21. The non-transitory processor-readable storage medium of claim 18, wherein the stored processor-executable instructions are configured to cause the processor to perform operations further comprising:
   determining whether a warning state of the UAV has been reached while the UAV is flying, wherein the warning state is a battery charge state in which the battery has stored a predetermined percentage of a maximum stored energy of the battery and provides an indication that the UAV should initiate a landing;
   detecting whether the UAV should use an extended flight protocol in response to determining that the warning state of the UAV has been reached; and
   maintaining the rotor in an energy consumption mode for propulsion in response to determining that the UAV should use the extended flight protocol.

22. The non-transitory processor-readable storage medium of claim 18, wherein the stored processor-executable instructions are configured to cause the processor to perform operations such that the emergency recovery mode comprises using a motor controlling the rotor to maintain a stable attitude by regulating an amount of energy generated by the motor in order to adjust an amount of drag generated by the rotor.

23. The non-transitory processor-readable storage medium of claim 18, wherein the stored processor-executable instructions are configured to cause the processor to perform operations further comprising:
   receiving a signal commanding the UAV to use an extended flight protocol that includes the emergency recovery mode.

24. The non-transitory processor-readable storage medium of claim 18, wherein the stored processor-executable instructions are configured to cause the processor to perform operations such that the braking mode includes regulating an amount of energy generated by the rotor in order to adjust an amount of drag generated by the rotor in order to control UAV attitude.

* * * * *